(12) United States Patent
Heard et al.

(10) Patent No.: US 11,482,201 B1
(45) Date of Patent: Oct. 25, 2022

(54) MATERIALS AND FABRICATION METHOD FOR PERCUSSIVE MUSICAL INSTRUMENTS

(71) Applicants: Robert A. Heard, Pittsburgh, PA (US); Ronald Lewis Samuels, Arcata, CA (US); Steven McHaney, Arcata, CA (US)

(72) Inventors: Robert A. Heard, Pittsburgh, PA (US); Ronald Lewis Samuels, Arcata, CA (US); Steven McHaney, Arcata, CA (US)

(73) Assignee: MARIMBA ONE, INC., Arcata, CA (US)

( * ) Notice: Subject to any disclaimer, the term of this patent is extended or adjusted under 35 U.S.C. 154(b) by 0 days.

(21) Appl. No.: 17/319,557

(22) Filed: May 13, 2021

(51) Int. Cl.
  *G10D 13/24* (2020.01)
  *G10D 13/08* (2020.01)
  *B29C 70/52* (2006.01)

(52) U.S. Cl.
  CPC ........... *G10D 13/24* (2020.02); *B29C 70/526* (2013.01); *B29C 70/527* (2013.01); *G10D 13/08* (2013.01)

(58) Field of Classification Search
  CPC ...... G10D 13/24; G10D 13/08; B29C 70/526; B29C 70/527
  See application file for complete search history.

(56) References Cited

U.S. PATENT DOCUMENTS

| | | | |
|---|---|---|---|
| 4,296,060 A * | 10/1981 | Killmeyer | B29C 70/528 264/339 |
| 4,411,187 A | 10/1983 | Roper et al. | |
| 4,649,791 A * | 3/1987 | Sawada | G10D 13/08 984/155 |
| 4,718,964 A | 1/1988 | Sawada et al. | |
| 4,805,513 A * | 2/1989 | Ito | B32B 5/28 984/155 |
| 5,198,602 A | 3/1993 | Roper | |
| D348,895 S * | 7/1994 | Ito | D17/22 |
| 5,333,527 A | 8/1994 | Janes et al. | |
| 5,469,769 A | 11/1995 | Sawada et al. | |
| 6,007,655 A * | 12/1999 | Gorthala | B29C 70/525 264/294 |

(Continued)

OTHER PUBLICATIONS

Jeff La Favre "Tuning the Marimba Bar and Resonator" web site http://www.lafavre.us/tuning-marimba.htm (1970).

(Continued)

*Primary Examiner* — Robert W Horn
(74) *Attorney, Agent, or Firm* — David Pressman (57) ABSTRACT

A method of making tonebars and other components for musical instruments comprises using a pultrusion apparatus to embed or coat glass, plant-based, and/or other fibers in or with a thermosetting, thermoplastic, or catalyzed polymer matrix. The coated fibers are pulled into a continuous bar in a curing and forming die. The bar is then cut into predetermined lengths. Each length is then carefully tuned by cutting and shaping so that when it is struck, it will emit musical notes on a chromatic musical scale. In one aspect, the fibers and resin are selected to produce tonebars for marimbas and xylophones that emulate the sound obtained from highly desirable Honduran rosewood at a fraction of the cost and environmental impact associated with this wood.

20 Claims, 2 Drawing Sheets

(56) References Cited

U.S. PATENT DOCUMENTS

| | | | |
|---|---|---|---|
| 6,365,812 B1 | 4/2002 | McGill | |
| 6,610,915 B2 | 8/2003 | Schleske | |
| 6,838,604 B2 * | 1/2005 | Abe | G10D 13/06 |
| | | | 84/404 |
| 7,541,530 B2 | 6/2009 | Terada | |
| 8,299,343 B2 | 10/2012 | Copeland | |
| 8,413,262 B2 | 4/2013 | Vito et al. | |
| 8,563,449 B2 | 10/2013 | Mueller et al. | |
| 8,895,827 B1 | 11/2014 | Grossman | |
| 9,570,054 B2 * | 2/2017 | Abe | G10D 13/08 |
| 10,909,954 B2 * | 2/2021 | Klosowiak | B32B 5/024 |
| 2006/0272478 A1 | 12/2006 | Steinhour et al. | |

OTHER PUBLICATIONS

Ashirvad Industries "Protrusion Production Process" web site https://www.youtube.com/watch?v=bRjU4na-ol8 (Feb. 18, 2012).

Heow Pueh Lee et al., An Investigation of the Sound Absorptioon Properties of Flax/Epoxy Composites Compared With Glass Epoxy Composites, Journal of Natural Fibers, 14:1 71-77, DOI: 10.1080/15440478.2016.1146643.

Prabhakaran et al., Sound and Vibration Damping Properties of Flax Fiber Reinforced Composites, Procedia Engineering 97 (2014) 573-581.

* cited by examiner

MATERIALS AND FABRICATION METHOD FOR PERCUSSIVE MUSICAL INSTRUMENTS

BACKGROUND

Prior-Art Materials

In the past, a wide range of materials have been used for the sound-making parts of percussive musical instruments, such as drums, xylophones, marimbas, and the like, and also stringed instruments.

Xylophones, marimbas, and other similar musical instruments use sounding elements, known as tonebar and also keys, which are typically made from wood, although certain types of instruments use metal, fibers, glass, and composites or other materials as well. Wood is chosen for its desirable tonal quality and several types of wood are more sought after for their superior tonal qualities, with rosewood being one of the most desirable.

Sustainably and responsibly harvested tone woods are becoming scarce. Also, tone woods are subject to degradation due to temperature and humidity variations, exposure to sunlight and rain, repeated strikes from mallets, and mechanical damage from handling of the instruments.

Synthetic alternatives to natural tone woods have been produced due to the scarcity problem and to provide more resilience to exposure to the outdoor elements and durability from repeated mallet strikes and handling. These synthetic tone woods are typically made from glass fibers bound together with thermoset or thermoplastic resins and may include other additives, although some are made from plastics and resins without fibers. While many of the synthetic tonebars can produce the desired musical notes (the fundamental note with overtones), the quality of the tone and the resonant characteristics of the overtones do not adequately emulate natural tone woods and therefore are less musically desirable.

BACKGROUND

Tone Woods and Tonebars

A tone wood is a wood that has tonal properties that make it suitable for the sound-making wooden portions (tonebars or keys) of marimbas, xylophones, woodwind, and tops, sides, and backs of the bodies of string instruments. The tonebars in percussive instruments and in the tops, sides, and backs of the bodies of stringed instruments have the following of modes of vibration: transverse, torsional, and lateral.

In the transverse (aka longitudinal) mode, the bar vibrates vertically or up and down at one or more sections. Each section has a center portion with a peak or crest where the vibrations have a maximum excursion. The extent of the vibrations in each section tapers down on both sides of the peak or crest to a node or null point between adjacent antinodes where no vibrations occur. Thus if salt is placed on a vibrating bar, the vibrations in each section will drive the salt away from the antinodes so that it all collects at the nodes. The vibrations extend from end-to-end of the bar and have a frequency according to the note sounded by the bar, ranging from tens of Hertz (Hz or vibrations per second) to up to 20 kHz.

In the torsional or twisting mode, the vibrations will take a twisting pattern extending from end to end when the bar is struck on an end This mode can be visualized by assuming that the bar is flexible and a person held the respective ends of the bar with opposite hands, and repetitively twisted it along its length by turning one end clockwise and the other end counter-clockwise and vice versa. The shapes that the bar assumes due to such twisting will imitate the vibrations in the torsional mode.

The lateral mode of vibrations is similar to the transverse mode, except that the bar vibrates horizontally or from side to side at one or more places along its length. Again, the peaks or crests of vibration are called antinodes and they are separated by nodes or null points. The vibrations in all modes are so small and rapid as to be virtually invisible, except for vibrations at low frequencies with high amplitudes.

Each mode of vibration can occur at a fundamental frequency, but each bar also concurrently vibrates at associated overtones or higher harmonic frequencies of varying amplitudes. These harmonics influence the sound emitted when a tonebar is struck and when a string instrument is played. All of the various modes and frequencies of vibration exist with varying amplitudes in all tonebars and non-tonebars. It is only when these various modes of vibration are addressed and tuned together that the material has the potential to become musical. The tuning of marimba tonebars to produce desired modes of vibration is described in a non-patent reference, Tuning the Marimba Bar and Resonator, by Jeff La Favre, cited below and which is incorporated herein by reference.

Natural Materials.

Wooden tonebars are produced with the natural wood grain oriented in the longitudinal direction of the bar. This results not only in the strength required for the bar to sustain repeated strikes from a mallet, but also affects the overall resonance of the fundamental frequency and the overtones when the bar is tuned.

Popular tonebars used on the tonebars of keyboard percussion instruments and on the tops, sides, and backs of stringed instruments have become increasingly rare and consequently costly. Musical instrument designers have attempted to use more commonly available and less expensive materials for these instruments, but they have not been able to make these materials closely mimic the behavior of the musically desirable tone woods.

One tone wood, Honduran rosewood (*Dalbergia Stevensonii*), is generally accepted as the most desirable for use in marimbas and xylophones since it imparts a sound that is particularly pleasing to a listener and is relatively durable. Brazilian rosewood, spruce, and maple are similarly used in guitars. Because of the popularity of these instruments, forests of tonebars have been over-harvested so that, as stated, these woods are becoming scarce and expensive. Consequently other, less suitable woods and artificial materials with poorer musical qualities are often being used.

Composite Materials

Composite artificial and non-natural materials are sometimes used instead of the usual range of natural materials. These materials are combined in ways that are intended to maximize the appeal of sounds that they produce when they are used in musical instruments. Tonebars for some percussion instruments are currently made of a composite material comprising fibrous materials embedded in epoxy, for example. Composite materials can be more resistant to environmental stresses than natural materials, but designing successful musical instruments, i.e., those with a pleasing sound that mimics natural tone woods, is very challenging and frequently requires a great deal of empirical experimentation in order to obtain a musically pleasing result.

BACKGROUND

Prior-Art References

The following is a list of some presently believed to be relevant prior art that shows materials and methods used in making percussive musical instruments. Following this list, we provide a discussion of these references according to the principal functions discussed in their disclosures.

| U.S. Utility Patents and Application | | | |
|---|---|---|---|
| Patent or Pub. Nr. | Kind Code | Issue or Pub. Date | Patentee or Applicant |
| 4,411,187 | A | 1983 Oct. 25 | Roper et al. |
| 4,649,791 | A | 1987 Mar. 17 | Sawada et al. |
| 4,718,964 | A | 1988 Jan. 12 | Sawada et al. |
| 4,805,513 | A | 1989 Feb. 21 | Ito et al. |
| 5,198,602 | A | 1993 Mar. 30 | Roper |
| 5,333,527 | A | 1994 Aug. 02 | Janes et al. |
| 5,469,769 | A | 1995 Nov. 28 | Sawada et al. |
| 6,365,812 | A1 | 2002 Apr. 02 | McGill |
| 6,610,915 | B2 | 2003 Aug. 26 | Schleske |
| 6,838,604 | B2 | 2005 Jan. 04 | Abe et al. |
| 2006/0272478 | A1 | 2006 Dec. 07 | Steinhour et al. |
| 7,541,530 | B2 | 2009 Jun. 02 | Terada |
| 8,299,343 | B2 | 2012 Oct. 30 | Copeland |
| 8,413,262 | B2 | 2013 Apr. 09 | Vito et al. |
| 8,563,449 | B2 | 2013 Oct. 22 | Mueller et al. |
| 8,895,827 | B1 | 2014 Nov. 25 | Grossman |

| Non-Patent Literature |
|---|
| JEFF LA FAVRE, "Tuning the Marimba Bar and Resonator", web site, http://www.lafavre.us/tuning-marimba.htm (1970) |
| ASHIRVAD INDUSTRIES, "Protrusion Production Process", web site, https://www.youtube.com/watch?v=bRjU4na-ol8 (2012 Feb. 18) |

Patents on Materials for Marimbas and Xylophones

In the above list, some of the patents disclose materials for marimbas and xylophones. In these, Roper et al. shows an array of multi-component composite vibratile musical bars that have differing decay characteristics depending on the content of a particular material in a bar. I.e., the decay period is longer when a bar contains a larger content of a particular material.

The Sawada et al. patents disclose a sound bar of Fiber Reinforced Polymer (FRP) characterized by an inclusion of reinforcing fibers with a particular orientation in a resin matrix and distributed longitudinal pores. The bars are used in percussion instruments. Longitudinal holes may be formed in the bar for lower cost production. Multiple bars may be laminated together. The fibers may be of boron, glass, aramid, carbon, silicon carbide, or boron nitride. The resin matrix may be a thermosetting resin, an unsaturated polyester resin, or a phenol resin.

Ito et al. shows a laminated FRP bar for percussive instruments. The bar comprises a plurality of laminated vertical layers made of a resin with reinforcing fibers (boron, glass, carbon, aramid) oriented in the longitudinal direction. A protective top plate 9 is bonded to the top sides of the laminated layers and optionally also to one side as shown at 8. Each of the laminated layers has an array of holes elongated in the direction of the fibers.

Abe shows a marimba (includes xylophones) having bars formed by three layers: a hardwood base, a fiber reinforced plastic mid layer (laminated sheets bonded together), and surface layer of hardwood. An epoxy adhesive is used to bond the layers together. The hardwood can be hormigo, maple, hard maple, beech, mahogany, rosewood, hard birch, padauk, or Chinese quince. The resonant frequency and vibration attenuation factors are measured for the layers, starting with the base layer, and calculations are made to adjust the parameters of each bar, as explained in cols. 7 to 8.

Roper discloses sound bars constructed of rosewood or plastic, with tongue and body integral rather than separate. The bars are for percussive instruments and are made of two dissimilar materials, a thin layer of wood or metal atop a thick layer of rubber or plastic. The two materials have different decay periods to make the decay period more uniform throughout the range.

Terada discloses a tone plate geometry that allows reduction in overall dimensions. The tone plates or tonebars are for keyboard percussion instruments and have a unique shape of varying thickness as shown in FIG. 5B so that they can be made shorter.

Patents on Materials Having Acoustic Properties for Other Instruments, Including Drums and Stringed Instruments Other patents listed above disclose materials having acoustic properties for other instruments, including drums and stringed instruments. In these, Janes et al. show a composite guitar soundboard of woven graphite fiber and epoxy. A guitar soundboard is made of laminated layers. Each layer contains graphite fibers with epoxy resin with more fibers in the longitudinal direction than in the latitudinal direction. Some of the layers may be woven graphite fabric and unidirectional graphite tape. The soundboard may include raised portions that form waves.

Sawada et al. '769 disclose a composite wood and synthetic piano soundboard. The soundboard comprises three layers, a middle plate or core, and outer plates. The core has a larger shearing modulus and/or a smaller shearing tangent than the outer plates to provide a smaller shearing loss in the treble and better tonal balance over the entire tonal range.

McGill shows a synthetic composite drumhead. The drumhead is laminated of four layers: the outer two layers are resilient polymeric film (terephthalate) and the two internal layers are made of fibers (polyaramid) oriented in orthogonal directions.

Schleske shows a fiber composite soundboard, e.g., for violins. The soundboard is made of a composite fiber sandwich with a selected ratio of stiffness to mass to increase sound radiation. The soundboard is larger than normal to compensate for frequency shifts due to the difference in the ratio. The patent speaks of the desirability of replacing wood with synthetic but does not give specific materials.

Steinhour et al. disclose a musical instrument molded of natural fiber reinforced cellular composite materials. It is supposed to match the tonal qualities of wood. A cellular resin is applied to a musical instrument mold (e.g., a drum) and then it is cured with fiber particles applied to form a composite instrument body. In this application he discusses the need for alternatives to wood and disadvantages and history in great detail.

Copeland discloses methods for damping steel drums and a set of steel pan instruments that cover different ranges. The playing surface of each instrument is adjusted according to the number of notes to be played the area of the notes, the radius of the playing surface, and the depth of the bowl that forms the playing, surface, and the number of drums that are used to form an instrument.

Grossman discloses a percussion instrument (e.g., a drum) with a composite dampening pad. The pad is attached on the skin or cymbal and has an upper section, a vibration-absorbing middle section, and a lower section in contact with the drumhead or cymbal. The upper section comprises a metallized layer, a fabric layer, and an adhesive layer. The middle section comprises a polyurethane foam layer and the lower section is butyl rubber.

Patents on Materials Used for Acoustic Purposes in Building Materials and Other Non-Musical Applications Still further patents in the list disclose materials used for acoustic purposes in building materials and other non-musical applications. In these, Vito et al. disclose the use of flax and other materials for use as sound and vibrational energy dissipating material (soundproofing) for machinery, vehicles, footwear, appliances, etc. Two elastomer layers sandwich a reinforcement layer of fibrous material with floating fibers, including flax; the reinforcement layer is compliant only in a direction normal to the elastomer layers.

Mueller et al. disclose an acoustic tile composition with flax and other materials with acoustic dampening characteristics. The tile has a core of an inorganic base fiber and an organic filament bi-component thermal binding fiber. The core may include other optional fibers, such as natural fibers (flax, bamboo, cellulose, sisal, and the like), and glass fibers.

All of the above acoustic materials have one or more disadvantages that make them less than optimal for use in musical instruments. A primary disadvantage is that the tonal qualities are not as pleasing as natural tonebars, particularly Honduran rosewood. Also, some are expensive, difficult to obtain, and/or difficult to fabricate and adjust for optimal tonal qualities.

Non-Patent Literature

La Favre describes the modes of vibration and tuning methods for obtaining the desired modes of vibration and sounds from the tonebars of a marimba.

Ashirvad Industries shows a video of a pultrusion process in operation. It is incorporated herein by reference.

SUMMARY

The present system and method provide a way of fabricating tone woods and keys that improve on various known acoustic materials. The system and method provide hybrid materials (combined natural and synthetic composite) that have musical qualities that are similar to rosewood and other tone woods. The tone woods and keys are formed by combining mineral fibers with resins in a pultrusion (pulling through a die) process, or by molding, forming, or casting. The fibers may be glass, carbon, polymers, basalt, quartz, metal, plant, and other fibers. The resins may be thermoplastic (able to melt), thermosetting (will not melt), catalyzed- or ultraviolet-light cured (will not melt) polymers. The resulting materials are suitable for making improved marimba and xylophone tonebars, tops, sides, and backs of stringed musical instruments, and for vibration control of structural and non-structural shapes.

REFERENCE NUMERALS

Figure 1:
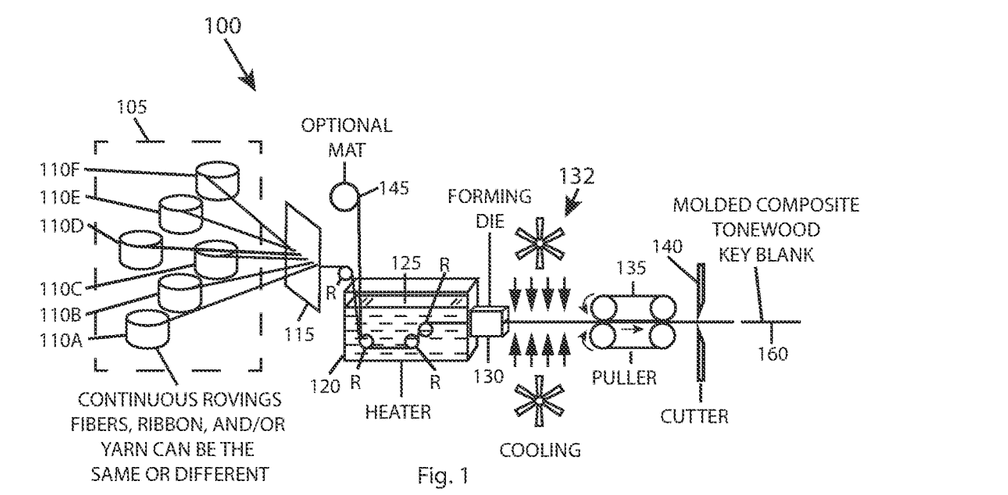
FIG. 1 is a schematic diagram of one pultrusion process used in the present method.

100 Pultrusion apparatus
105 Creel
110 Spools of fibers
115 Guide plate
120 Resin bath
125 Resin
130 Forming die
132 Cooling apparatus
135 Puller
140 Cutter
145 Mat or ribbon
160 Molded composite tonebar or key blank
160A, B Molded and tuned composite tonebar or key
300 Hole
400 Glass yarn
405 Natural fiber yarn First Embodiment—Description—FIG. 1

The present system uses process known as pultrusion for producing tonebars of non-natural materials. As defined by Wikipedia, the word pultrusion is a portmanteau of "pull" and "extrusion" and is a continuous process for manufacture of fiber-reinforced plastics with a constant cross-section. Pultrusion is opposed to extrusion, in that extrusion pushes the material through a die, while pultrusion pulls the material through. FIG. 1 is a schematic diagram showing a pultrusion system or process for producing sound bars for musical instruments with embedded fibers, ribbons, and/or mats. The construction and operation of pultrusion machines is well known. Exemplary pultrusion machines are sold by Liberty Pultrusions of Pittsburgh, Pa., USA. A video of a pultrusion process in operation can be seen at the Ashirvad Industries site, supra.

Figure 2:
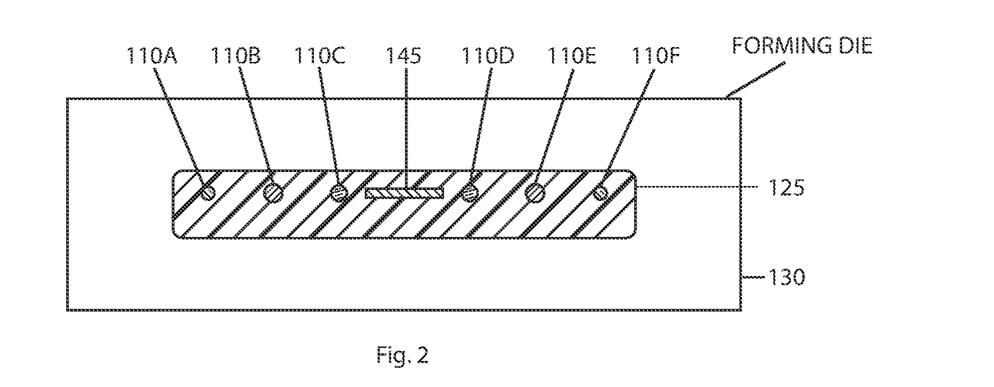
FIG. 2 is a cross-sectional view of the output side of a forming die used in the process of FIG. 1 and showing an arrangement of fibers and ribbons in a pultruded resin matrix.

Pultrusion apparatus 100, shown in schematic form, operates with a process direction from left-to-right. The apparatus comprises a fiber supply creel 105 containing spools or bobbins 110A to 110F of fibers or yarns. The fibers and yarns are pulled out of the creel (as will be described) and are guided by a guide plate 115 into a resin bath 120 containing a hot liquid thermoplastic resin polymer 125. Spools or fibers and yarns 110A-110F and optional additions in creel 105 are guided by a plurality of rollers or guides (not shown for enabling clarity of illustration), but are well known in the pultrusion arts. A downstream pulling apparatus or puller 135, discussed infra, slowly pulls the fibers or yarns pulled out of the creel and through resin bath 120 where the resin adheres to and penetrates them so that they emerge from the bath coated with the resin as a single elongated member embedded with the fibers or yarns. The emerging member then moves (under pull from puller 135) through an exemplary forming die 130 for forming a continuous thermoplastic polymer resin strip or bar embedded with the fibers. FIG. 2 shows an elevational view of the output side die 130. It has a rectangular opening containing the emerging resin member 125 (shown in cross-section) with embedded fibers 110A to 110F.

The bar next moves (still under pull from puller 135) through a cooling apparatus 132 for curing and hardening the thermoplastic polymer resin. (The cooling apparatus can be omitted and the bar can be air-cooled.) Then puller 135 pulls the bar or strip and the embedded fibers or yarns itself and pushes out the bar or strip into a cutter or cutting station 140, which cuts the strip into segments. The segments or individual molded blanks are then further processed and tunes, as explained below, and can then be used as tonebars in a marimba or xylophone.

As indicated, each spool or bobbin in creel 105 has a continuous winding or roving (slightly twisted bunch) of fibers or yarns. The yarns or fibers on the spools can be the same or different materials. In one example six bobbins or spools are provided in creel 105 as shown and each is wound with rovings of glass, metal, animal, mineral, and plant fibers.

Guide plate 115 is a foraminous (having holes) metal, plastic, or wood plate that receives the individual fibers in a predetermined arrangement, such as the single row of holes shown where the plate on its left side. After exiting the plate, the spaced fibers overlie and pass over a leftmost roller R. The fibers exiting guide plate 115 are arranged in a single row in the same order and spacing as fibers 110A through 110F, as shown in FIG. 2. (Ignore mat 145 temporarily.)

Instead of being arranged in a single row as shown, the foramen or holes in guide plate 115 can be arranged in plural rows, above and/or below a central row. To accommodate the plural rows, additional rollers R would be provided (not shown) so that the exiting fiber arrangement corresponds to the plural rows of holes in guide plate 115.

Alternatively, the holes in guide plate 115 can lie in plural straight lines or rows and the individual fibers can be guided by additional rollers in plural rows (not shown) to achieve plural rows of fibers in finished key blank 160.

As stated, the fibers leaving guide plate 115 (in a single or plural rows) are passed through resin bath 120 where they pick up are coated with a resin 125. Resin 125 is a thermoplastic, thermosetting, catalyzed, or UV-cured polymer. In the present example the resin is thermoplastic polycarbonate. As indicated, bath 125 contains or is coupled to a heater to keep resin 125 liquid but viscous enough to adhere to the spaced fiber strands being pulled therethrough.

As shown, an optional mat 145 (or plural mats) can be assembled with the fibers and embedded in the resin bath to form a row of fibers with a central mat 145, as shown in FIG. 2.

Figure 3A:
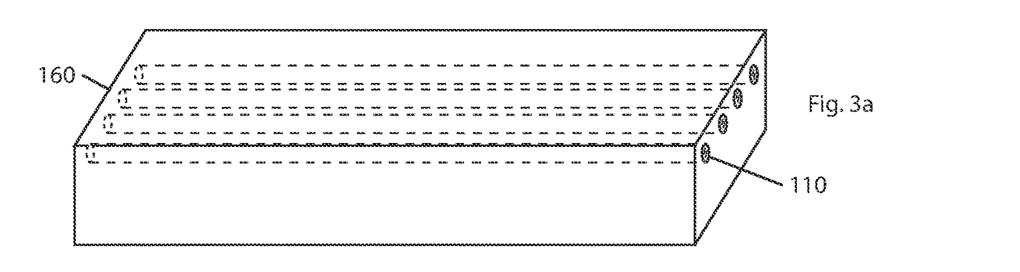
FIGS. 3a and 3b are perspective views of a molded composite tone wood key blank and a finished tonebar, respectively.
Figure 3B:
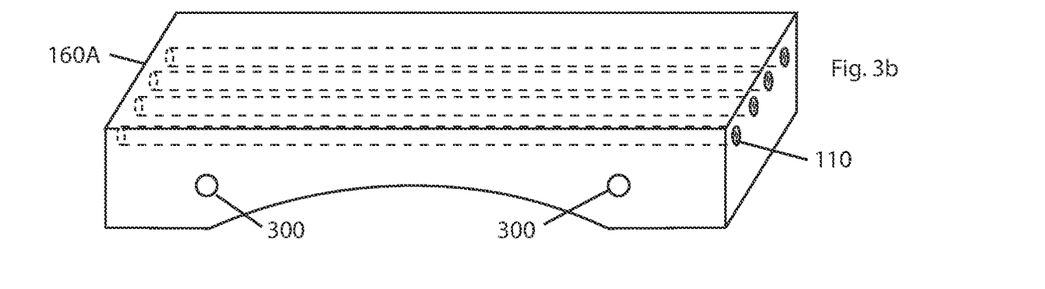

As they leave resin bath 125, the resin-coated fibers and optional mat are slowly passed through forming die 130 (FIGS. 1 and 2) for shaping the resin-coated fibers and mat into a bar or strip as shown in cross-section in FIG. 2. Forming die 130 is a pultrusion die. It has a single opening that has the cross-sectional shape and size of the desired tonebar blank shown in FIG. 2. It enables all the components, i.e., fibers 110 and optional mat 145 embedded in resin 125, to form the composite bar as the assemblage is pulled through die 130. There is a decreasing temperature gradient from the inlet side of the die where the resin-coated fibers enter from the bath to the outlet side of the die. The resin goes into the die molten but viscous and comes out nearly solid. Due to the viscosity of the resin and the slow pulling of the fibers by puller 135, the bar or strip leaving the die can have a larger size than the area of the fibers, as shown in FIGS. 2, 3a, and 3b. Note that the fibers are positioned near the top of the die's opening and in the upper portion of the bar's cross-section, leaving a large area at the underside of the bar that is free of fibers for a purpose to be discussed.

When cured, the polymer resin coating on the fibers and forming the rest of the bar can be transparent, translucent, opaque, colored, patterned, or wood-like in appearance. In the present example the polymer resin was cured by cooling.

The assembly of resin and embedded fibers emerges from die 130 as a bar or strip, as shown in cross-section in FIG. 2, is then drawn through cooling section or station 132 for hardening the extruded resin and fiber composite bar.

As stated, puller 135, which pulls the bar of hardened resin-containing fibers 110 and optional mat 145 through the sequential stages described from creel 105 and bath 120 through forming die 130 and cooling station 132, comprises a tractor arrangement with rotating treads (not shown but well-known) that are in non-slipping, pressure-like contact with the cooled and shaped fiber assembly.

After leaving puller 135, cutter 140 cuts the bar of hardened resin-containing fibers 110 into predetermined lengths. Cutter 140 comprises a vertical blade that cuts the bar into sections 160 that are ready to be subjected to a tuning process, to be described. In the present example a cut composite tonebar had a rectangular cross section, 2.1 cm in height and 3 cm in width, and comprised a resin bar containing a mat of polycarbonate, wool, glass, metal, and plant fibers. It was cut to a length of 20 cm, but the length can be adjusted according to the musical needs of the user. The height and width and shape can be changed by using a different die.

As stated, FIG. 1 shows how one or more optional mats or ribbons 145 can be added to the process when required. Mat or ribbon 145 is wound on a roller or spool and guided into resin 125, along with the fibers bundle from guide plate 115. The assembly of fibers and an optional mat is coated by the resin so that it leaves bath 120 as a semi-firm ribbon of warm resin and fibers. Mat 145 can be wool or plant fiber or woven felt material in the shape and size indicated in FIG. 2.

Operation—FIGS. 1 and 2 In preparation for operation of apparatus 100, resin bath 120 is empty. Fibers 110A through 110F are manually threaded through guide plate 115, manually urged past the leftmost roller R above bath 120, then in the bath beneath the two bottom rollers R, up over the rightmost roller R, through forming die 130, and cooling station 132. The fibers (and mat 145 if used) are fed into the treads (not shown) in puller assembly 135. The treads have a springably urged, non-sliding contact with the fibers so that the treads can pull the fibers. Then puller 135 is activated so that it pulls the fibers through the pultrusion apparatus a short distance. Puller 135 is stopped while the fibers 110 and optional mat 145 are secured in place. Now bath 120 is filled with the liquid resin.

After the resin covers all fibers in bath 125, cooling station 132 and puller 135 are activated. The puller draws the fibers through resin 125 so that a composite bar or strip of resin embedded with the fibers and optional mat then is shaped by die 130 to form moving bar 125 having the shape and fiber positions shown in FIG. 2. The bar is soft and hot at this stage. It then passes through cooling section 132 where it is cooled by moving air, thereby hardening the resin. After the bar is cooled and hardened in cooling station 132, it is pushed by puller 135 into the jaws of cutter 140 where it is cut to predetermined lengths by cutter 140, thus forming a series of molded composite tonebar blanks as shown in FIG. 3a.

The shape and composition of the product produced by the pultrusion system of FIG. 1 can be changed as desired. E.g., fewer than all fibers 110A through 110F can be used in the composite, or additional fibers can be used, depending on the desired construction of the tonebars.

A wide variety of tonebars can be constructed, depending on the instrument, the pitch desired, and the musical qualities of the bar desired.

The pitch or fundamental frequency of the tone of any tonebar is primarily determined by its dimensions, with longer and larger bars producing lower notes and vice versa. The size and cross-sectional shape of the pultruded bar can be changed as desired, as can the position of the fibers in the bar, by arranging the rollers in bath 125 and the shape of the die opening. The opening in forming die 130 determines the thickness and shape of the bar.

With respect to other musical qualities, glass fibers increase the amplitude of all frequencies of the tonebars, making them musically "brighter", and increasing the overall ring time of the tonebar. Natural fibers, such as flax, ramie, hemp, and other natural materials, attenuate the ring time of the upper harmonics relative to the fundamental frequency, resulting in a stronger fundamental frequency when compared to the upper harmonics. Increasing the number of glass fibers and decreasing the number of natural fibers will increase the amplitude of the harmonics and also the overall ring time. Conversely, increasing the number of natural fibers and decreasing the number of glass fibers will attenuate the overtones relative to the fundamental and also decrease their ring time, thus making the bar sound warmer and darker. By adjusting the combination of glass and natural fibers, one can adjust the relative levels of expression of the fundamental ring tone and its overtones (harmonics) to obtain the desired timbre of any pultruded bar and to more closely emulate the desired natural wooden bar.

Mat 145 or a ribbon serves to control the placement of the glass or natural fiber and thus provide more predictable acoustic results from batch to batch. The mat or ribbon can be eliminated or plural mats or ribbons can be included. The fibers in the mats may be composed exclusively of glass, or of natural fibers such as flax, ramie, hemp, etc. The fibers in the mats may be woven from a combination of linear orientated glass or other fibers and natural materials, such as flax, ramie, hemp, etc. Ribbons of these materials may be utilized for pultrusion of tonebars and mats, primarily for batch molding and production of the tops, sides, and backs of stringed instrument.

The system shown can also be used to fabricate components other than tonebars, such as instrument tops, sides, and back boards. The tops, sides, and backs of violins and guitars can be molded to closely duplicate the respective harmonic frequency response of their wooden instrument counterparts, based on an analysis of the transverse, torsional, and lateral modes of vibration.

FIG. 2 is a right-hand (output) end elevational view of forming die 130 showing one exemplary arrangement of fibers embedded in resin 125 as the bar leaves the die. Resin 125 has begun curing at this point and is relatively solid. Fibers 110A through 110F can be the same or different in size and composition. The selected position of the fibers in the bar is controlled by the positions of the rollers in the molten portion of bath 120 and this selected position is fixed as the resin hardens at the output of the die and at cooling station 120.

In one aspect, fibers 110A and 110F are of one size, in the present example 3 mm in diameter, and are made of a glass fiber bundle. Fibers 110C and 110D are of a different size, 2 mm in diameter in the present example, and are made of a plant-based fiber bundle, such as ramie, flax, hemp, etc. Fibers 110B and 110E are a third size, here 5 mm diameter, and the material is twisted yarn fibers of a plant, glass, or mineral material. Mat or ribbon 145 comprises any of the following: glass fibers, plant fibers, and/or metal strands that are woven, glued, stitched, or otherwise joined together in a continuous web. In the present example, mat or ribbon comprises a plurality of hair-fine fibers of flax, ramie, hemp, other natural fibers, or glass lineal fibers. The natural fibers can also be mixed or mixed with lineal glass fibers that are sintered together in a rectangular ribbon shape. In some cases, use of such a ribbon instead of rovings 110A through 110F facilitates threading of the pultrusion material during setup of the apparatus.

The fibers can be formed into yarns of various weights and should be of a relatively loose and low twist arrangement. The yarns may have between 20 and 100 twists per meter and the twist may be S (left-handed) or Z (right-handed). A looser twist facilitates impregnation of resins during the manufacturing process and makes the fibers more linear, thereby increasing the musical properties of the tonebar. Fibers of various kinds, including glass and other mineral fibers, metal, and natural fibers, can be woven together, either as a yarn or within ribbons, in order to save time and labor when threading for pultrusion or casting. Ribbons of the same or different compositions can be overlaid on one-another to save time and labor.

Plant based fibers made into yarn may be blended with glass or mineral fibers to aid pultrusion. They can also be made into unidirectional fabrics for mat 145 in FIG. 2. Plant-based fibers made into yarns would be simultaneously pultruded with glass or mineral fibers in a ratio of approximately 70% glass strands to 30% natural plant-based strands. Plant-based fibers blended into yarns with mineral or glass yarns can then be made into ribbons of fabric and stacked on top of each other for pultrusion. The proportion of natural fibers to glass or mineral fibers can be changed, depending on the desired musical properties of the finished result. Natural fibers, including flax, ramie, and hemp, function as sound attenuators. The total fiber content in a finished tone bar should usually be in the range of 60 to 80% by weight, with natural fiber being in the range of 3 to 10% by weight (This is equivalent to a total fiber content in the range of 56 to 78% by volume, with natural fiber being in the range of 5 to 16% by volume based on a typical specific gravity of 1.43 for natural fiber, 2.55 for glass fiber, and 2.00 for resin).

All tonebars and other shapes of acoustic materials concurrently vibrate in multiple modes of vibration (transverse or longitudinal, lateral, and torsional). The addition of plant-based fibers has a damping effect on all modes of vibration, and is proportional to the quantity of plant-based fiber relative to the glass, mineral, and resin. I.e., because of the damping qualities of plant-based fibers, both torsional and lateral modes of vibration of a sound bar can be manipulated, depending on where the plant-based fibers are concentrated in the ribbon. E.g., concentrating the plant-based fibers in the middle of the ribbon will lower the lateral frequency of a tonebar, while concentrating them along the edges of the tonebar will raise its lateral frequency.

It is useful to know the modes of vibration and how to adjust any mode because, at the lower notes, multiple modes of vibration come into play and interact with each other and these modes must be addressed to optimize the musicality of the tonebars. One potential problem occurs when a mode of vibration is a whole number multiple of any other mode of vibration. The result is an amplifying effect, an increase in volume of the lower frequency whole number harmonics because of this whole-number relationship. Another problem can occur when the lateral mode is within a whole tone or less of a transverse vibration. If this occurs, the listener will hear a clash of the two frequencies—a dissonance—thus adversely affecting musical clarity. A manufacturer may increase damping by adding more plant fibers or prolong longer ring time by adding more glass fibers, as necessary to match the musical qualities of a high-grade tone wood.

The yarns that are formed into unidirectional fabrics or ribbons and used in the manufacturing process for mats should have a predominance of the yarn arranged in the longitudinal direction. Periodic transverse threads can be added in order to maintain a desired structure in ribbons comprising tapes or cloths. All fibers, both natural and synthetic, are ideally un-crimped to help promote longitudinal arrangement of the fibers.

FIGS. 3a and 3b

While FIG. 2 shows one arrangement of six fibers of different diameters and a central mat, many other arrangements of fibers and mats are possible.

FIGS. 3a and 3b show an exemplary molded composite blank 160 after it is cut and removed from the pultrusion process. This blank has only four fibers, all of the same diameter. As will be described, the blank is further processed to make a marimba or xylophone key.

The blank of FIG. 3a is tuned by machining material therefrom until it has the desired tonal characteristics for the instrument in which it is to be used. I.e., the tone is adjusted by removing material. Tonebars can be manipulated to have different modes of vibration by the selective removal of material from the underside of the tonebar. In the present example an arch is cut in the underside of the blank as shown in the completed key 160A of FIG. 3b. An arch on the underside of any tonebar lowers the frequency response of all transverse vibrations. The shape of the arch determines the relative degree that the fundamental is lowered relative to the transverse overtones. Holes 300 are made at the vibrational nodes (where there is minimal vibration) in order to mount tonebar 160A on support rods of a marimba.

In lieu of the single-row layout of FIGS. 2, 3a, and 3b, the mat and the fibers can be in separate rows or can even be in more than two rows in various arrangements.

The tonebar of FIGS. 3a and 3b can be made thicker and wider by changing the size and shape of the opening in forming die 130. Tonebars for marimbas and xylophones are cut to be longer for lower notes and shorter for higher notes. The present system can fabricate tonebars which have a sound that approximates the sound of rare tonebars, including Honduran rosewood.

Figure 4A:
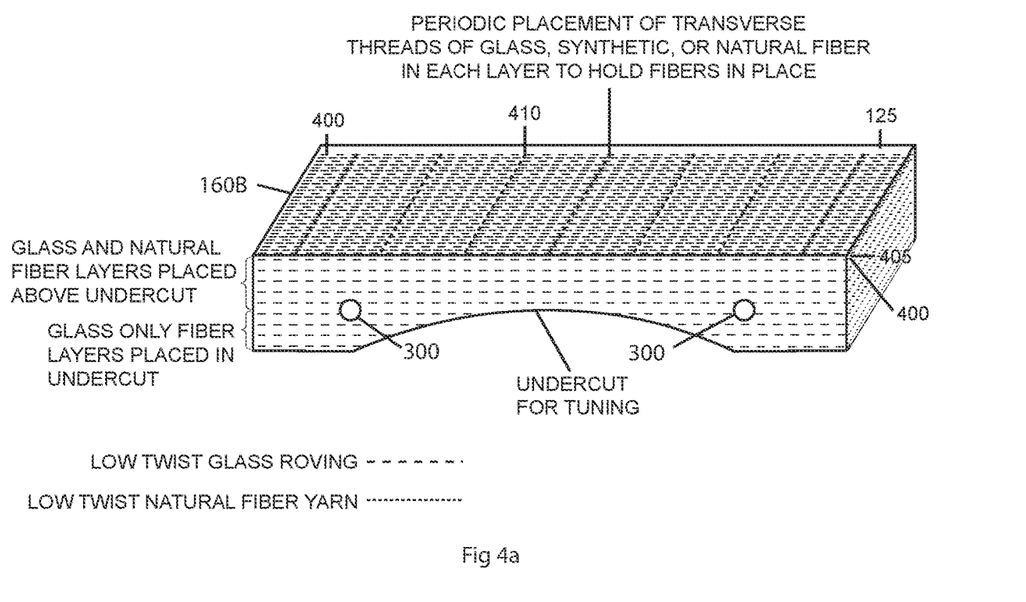
FIGS. 4a and 4b are respectively perspective and end views of an exemplary tonebar with a specific tuning.
Figure 4B:
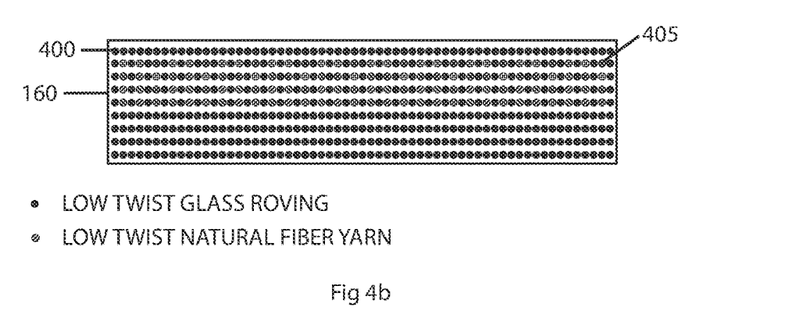

Hybrid Composite Tonebars with Characteristics that Closely Match Wooden Tonebars—FIG. 4.

One of the main challenges in making synthetic tonebars is creating the musical quality in the finished bar that closely emulates the musical quality of desired tone woods. While the desired musical note can be readily achieved with synthetic materials, namely glass fibers and resins, the resulting bars often have an excessively long ring time and an imbalance in the resonance of overtones. There have been various approaches to address these issues, including constructing tonebars with void spaces, or grooves. However, what has heretofore not been adequately addressed in the manufacturing of composite tonebars from fibers and resins is the selection of alternative materials to address dampening. The factor that balances out the musicality of the finished bar made of glass fibers and resin is the incorporation of natural fibers, resulting in a hybrid composite.

The natural fibers incorporated into a tonebar have a dampening effect that is necessary to reduce ring time of glass fibers, improve the resonance of the overtones, and produce a more natural tone in the finished hybrid composite bar.

Selection of Natural Fibers.

Important characteristics in selecting natural fibers for hybrid composite tonebars include the density and the Young's modulus. Density is simply the mass per unit volume. Young's modulus, also known as elastic modulus, tensile modulus, or modulus of elasticity, is a measure of tensile stiffness. Young's modulus is the ratio of stress to strain and is equal to the slope of a stress strain diagram. Stress is the force applied and strain is the resulting deformation. The higher the Young's modulus of a material, the more resistant the material is to deforming under load. When selecting natural fibers for hybrid composite tonebars it is desirable to select fibers with a relatively high Young's modulus. Also, natural fibers that have relatively long strands of bast (strongly woody) fibers is beneficial from an acoustical standpoint. Longer bast fibers can more readily be converted to low twist yarns. Natural fibers such as flax and ramie have relatively long bast fibers and have relatively high Young's moduli, and hence are desirable for making hybrid composite tonebars, although a variety of other fibers may be used as well.

Amount of Natural Fibers

The overall hybrid composite tonebar is made up of resin that may include a relatively small number of additives and colors, in addition to glass fibers, and natural fibers. As previously indicated, the natural fibers in a hybrid composite produce an overall dampening effect and also enhance other musically acoustical characteristics. The goal is to achieve the ideal dampening of the glass fibers and it has been found that a relatively small amount of natural fiber is needed to achieve this. The resin is typically the costliest component by weight and is necessary to bind the fibers together. The additives comprise a small number of catalysts, release agents, fillers, and other additives that are well-known and readily commercially available. The additives may be incorporated for manufacturability and aesthetics, as well as for other performance characteristics. Therefore, composites are typically predominately glass. The ideal blend for a hybrid composite tonebar is approximately 60-80% by weight glass, 2-5% by weight natural fiber (equivalent to approximately 54-74% by volume glass, 3-8% by volume natural fiber based on based on a typical specific gravity of 1.43 for natural fiber, 2.55 for glass fiber, and 2.00 for resin), and the remainder resin and a small fraction of additives. The amount of glass used is typically limited by the ability to thoroughly wet out the fibers with resin and to compress the fibers in the manufacturing process.

The amount of natural fiber required will depend on the characteristics of the natural fiber being used and the ideal musicality of the finished hybrid composite tonebar is sensitive to the amount of natural fiber. Too much natural fiber will cause the bar to be overdamped and too little will cause it to be underdamped. The amount used in any arrangement can easily be selected according to the desired degree of damping and can vary from the amounts shown in the examples given.

Fiber Orientation

Natural wood is orthotropic, meaning that its properties vary in orthogonal directions. This is a result of the orientation of the natural fibers of the wood. Wooden tonebars are created with fibers of oriented primarily in the longitudinal direction of the bar, as can be seen in the grain patterns of the bars. The orientation of fibers contributes to important desirable musical and strength characteristics in tonebars.

The fibers in hybrid composites are also aligned primarily in the longitudinal direction for desirable musical and strength characteristics. Orientation of fibers essentially in one direction is referred to as unidirectional. The use of strands of rovings and yarns works well in pultrusion because rovings or yarns are aligned essentially in the longitudinal direction as part of the manufacturing process as they are pulled through the heated die. Fibers can be oriented unidirectionally in molds as well.

Fiber Twist.

Since it is most desirable acoustically to maintain the fibers in the longitudinal direction as in wood tonebars, it is most effective to employ straight untwisted fibers in the present tonebars. However, some degree of twist is necessary with certain types of fibers to impart additional tensile strength in the material. The process of producing glass and other mineral rovings results in essentially continuous fibers that are generally given a very low twist. Natural materials, on the other hand, have shorter natural bast fiber length limited by the characteristics of the plant and manufacturing processes so natural fiber yarns are also often given a twist to provide the desired tensile strength. From an acoustical perspective, linear fibers are most desirable, so selecting natural fiber yarns with the lowest twist possible is ideal. In a pultrusion application of a hybrid composite with glass and natural fibers, the glass fibers can take the pulling load during manufacturing and so the natural fiber yarns do not require a tensile strength as high as glass. Natural fibers require some degree of twist in the process of manufacturing yarn. It has been found that approximately 20 turns per meter is needed for natural yarn manufacturing and this degree of twist is acceptable in achieving the goal of essentially linear fibers in hybrid composite tonebars. Less twist would be more desirable if achievable in the yarn manufacturing process and if compatible with the hybrid composite manufacturing process.

Variations in the Incorporation of Fibers into the Manufacturing Process.

Manufacturing processes for making hybrid composite tonebars can use a series of individual strands of rovings or yarns incorporated directly in the manufacturing process. This is the more typical approach in industrial pultrusion. However since a relatively small amount of natural fiber is needed for the desired musical dampening, this results in a relatively small number of strands of natural fiber yarn compared to glass roving. Also it has been found that the location of the natural fibers as individual strands cannot be reasonably controlled through the pultrusion die, resulting in undesirable tuning characteristics. There are several solutions to this challenge.

One approach is to use more strands of lighter weight natural fiber yarns, but this requires more setup of smaller lower tensile strength yarns and complicates the manufacturing process. Another approach is to create a yarn of glass blended with the desired amount of natural fiber and then use this blended fiber throughout and hence it is evenly distributed throughout the bar. This addresses the distribution issue, but it can be difficult to make a glass and natural fiber blended yarn since the finished bar requires an undercut and it is more desirable to concentrate the natural fiber above the undercut. Also, a uniform yarn does not allow variations in the amount of natural fiber in the transverse direction, which can be useful in controlling the modes of vibration. A third and presently preferred approach is to weave the individual strands into cloth ribbons, also known as tapes, which are then used in the manufacturing process. This greatly simplifies the pultrusion process and keeps the fibers in place both horizontally and vertically in the bar cross section.

The process of making ribbons involves setting up weaving equipment for making unidirectional fabric, which requires periodic transverse threads, and may also include a lightweight veil to hold the unidirectional fibers in place. A variety of stitching patterns and veils are available. Since they represent a small fraction of the material, they can be made of glass, polyester, or other fiber and have a de minimis influence on the acoustical performance.

In producing the cloth, the location of the natural fibers relative to the glass fibers can be controlled through a variety of layouts. If a uniform distribution is required, natural fibers can be alternated with the glass fibers, inserted as every third fiber, etc., to achieve the required blend based on the desired weight or volume of the glass and natural rovings and the distribution across the cloth. For example, if an even distribution across a finished bar is desired, then ideally the natural fiber should be alternated with the glass fibers to achieve the most uniform distribution.

This desired distribution can be woven into a full width cloth that is then slit to the desired width after weaving. This approach, however, leads to frayed edges of the ribbon which causes handling and manufacturing problems. Full-width weaving and then slitting to the desired ribbon width also does not lend itself to creating ribbons with a precise non-uniform lateral pattern of natural fiber in a bar such as more glass on the outside of the bar and more natural fiber towards the center, which can be desirable for controlling modes of vibration.

To address this issue, the distribution of glass and natural rovings in the finished ribbons can set up to the desired bar width and can be slit during the weaving process. To accommodate this approach, a longitudinal fiber end is left out of the machine setup at the desired location of the slitting and the ribbons are simply neatly slit between the longitudinal fibers while weaving. This approach also readily allows the manufacturer to setup of a wide variety of glass and natural fiber patterns in the ribbon to achieve the desired acoustical characteristics.

The approach of creating ribbons also requires making a hybrid glass fiber and natural fiber ribbon as described and also making an all-glass ribbon so that the natural fiber can be located above the undercut and the fibers held in the desired location in the bar.

In one presently preferred example of creating a full width cloth that is slit while weaving, a 1100 TEX (grams per 1,000 meters) glass roving and a 1100 TEX natural fiber roving are made into ribbons of alternating fibers with a total of 5 strands per cm (approximately 12 strands per inch) and a finished cloth weight of 520 grams per square meter (approximately 15 ounces per square yard). As an example, the target goal of the finished bar may be approximately 3-4% by weight natural fiber and approximately 76-77% by weight glass fiber, and the remainder approximately 20% resin and additives. The finished bar (FIGS. 4a and 4b) would have four layers of such a hybrid ribbon and 39 layers of the glass-only ribbon. The stack of fiber layers in the bar would be a top layer of glass-only ribbon, then plural layers of alternating rows of hybrid and glass ribbon, and then glass ribbon for the remainder. A veil having a wood-grain or another pattern can be wrapped around the stack as it is pulled into the pultrusion die. The number of layers of ribbon should be adjusted according to the TEX of the glass and natural fibers, the number of strands per inch, and the desired amount of natural fiber in the finished bar.

The creation of ribbons by slitting a full width cloth can pose challenges in creating precise ribbon widths to match finished bar widths and the transverse threads intended to hold the longitudinal fibers in place are cut in the process which tends to weaken the finished ribbon. A preferred alternative that addresses these issues is to use a loom designed for narrow ribbon weaving rather than a loom designed for whole cloth weaving. A loom designed for narrow ribbon weaving shuttles the transverse thread back and forth across the desired ribbon width and hence the ribbon is produced at the finished width without slitting and with a clean edge. As an example, suppose a 2000 TEX glass roving and a 2000 TEX natural fiber roving are made into ribbons of alternating fibers, with a total of 5 strands per cm (approximately 12 strands per inch) and a finished ribbon weight of 943 grams per square meter (approximately 28 pounces per square yard). The previously stated target goal of the finished bar is approximately 3-4% by weight natural fiber and approximately 76-77% by weight glass fiber, and the remainder resin and additives. The finished bar would require two layers of such a hybrid ribbon and 22 layers of the glass only ribbon. The stack of fiber layers in the bar would be the same as with the previous example, with a top layer of glass only ribbon, then alternate layers of the hybrid and glass ribbon, and then glass ribbon for the remainder. Similarly, a veil having a wood-grain or another pattern can be wrapped around the stack as it is pulled into the pultrusion die. The number of layers of ribbon should be adjusted according to the TEX of the glass and natural fibers, the number of strands per inch, and the desired amount of natural fiber in the finished bar.

FIGS. 4—Exemplary Tonebar with Uniform Distribution of Natural Fibers Above Undercut FIGS. 4a and 4b show a tonebar (perspective and elevational end views) where the top layer is all-glass fibers 400, the ribbons or layers below the glass layer down to the top of the labeled tuning undercut have alternating rows of glass rovings 400 and low twist natural fiber yarns 405. I.e., in each layer below to top layer and above the undercut, the rows alternate between glass rovings 400 and low twist natural fiber yarns 405, as illustrated. The layers of rows within the range of the undercut, which lies at the lower portion of bar 160B, are made of glass fibers 400 only and these are pultruded and encased along with the alternating and all-glass rows above the undercut. The natural fibers are used above the undercut because the modes of vibration are predominately affected by the material above the undercut, which is where it is desirable for the natural fibers to have their dampening effect. The natural fibers may also be arranged in other patterns to achieve the desired acoustical effect. The twist of rovings 400 and yarn 405 is two turns per cm, although other amounts of twist can be used. A plurality of transverse threads 410 are periodically secured to all of the rows in each layer before the fibers in these layers enter resin bath 120 (FIG. 1) to hold the fibers in place during pultrusion. Threads 410 are secured to the fibers using adhesives or thermal bonding.

Resin 125 is polyurethane, although other resins can be used. Resin 125 preferably is tinted with a colorant that matches the color of Honduran rosewood. Of course, other colors or even clear resin can be used. The diameters of individual glass and natural fibers used in rovings 400 and yarn 405 are between 25 and 50 microns, although other diameters can be used. The individual fibers are arranged into rovings (yarns) of variable weight (TEX) depending on the overall areal weight of the ribbon produced and any limitations on the looms employed to make the ribbons. Variables of twist, number of rows in each layer and number of layers, type of resin, etc., are determined by the desired sound qualities of each tonebar. At middle C-C4-the dimensions of tonebar 160B are approximately 38.1×5.24×1.27 cm in length, width, and thickness, respectively.

SUMMARY, RAMIFICATIONS, AND SCOPE

Accordingly the reader will see that, according to one or more aspects, I have provided a process for making musical tonebars or other instrument sounding components with any desired characteristics or pitch, damping, and timbre, without requiring expensive and increasingly rare woods. These improve upon many of the properties of existing wood substitutes yet can be made more economically and with far less ecological harm.

The present system uses a pultrusion and molding processes for assembling plant-based and mineral fibers in a resin into tonebars with various characteristics according to the need of the intended instrument. Fibers can lie in a plane within the final tone key or they can lie above or below a central location within the key. Using a predetermined combination and arrangement of these fibers within a selected resin permits continuous casting of a composite tonebar that has desired musical properties. The composite material can be made available in various colors and textures. In the last step of the pultrusion process, the composite material is cut into predetermined lengths. The proper selection of resin, fibers and their location within a tonebar permits emulation of the sound and timbre of Honduran rosewood, for example, at a fraction of the cost and environmental impact.

While the above description contains many specificities, these should not be construed as limitations on the scope, but as exemplifications of some present embodiments. Many other ramifications and variations are possible within the teachings. For example, glass may be blended with natural fibers into uniform hybrid yarns or may be used separately. Fibers woven into yarns may be used as individual strands or may be woven into ribbons prior to use. The tonebars can be made thicker or thinner; they can have different shapes; and they may be made in colors or made to look like Honduran rosewood, if desired. The mat (ribbons) can be made up of a combination of glass (or other fibers mentioned elsewhere) and natural fiber. This saves time in the setup of the pultrusion process because it combines both the glass etc. fibers and natural fibers in a single ribbon. The hybrid layers of alternating glass and fiber rows of FIG. 4 and instead be substituted with alternating layers of all-glass and all-fiber rows. The roving, ribbon, or mat can be made exclusively of mineral, glass, metal, and polymer materials, or exclusively of plant-based fibers, or of a combination of mineral, glass, metal, and polymer materials and plant-based fibers spun together in rovings, ribbons, or mats.

Thus the scope should be determined by the appended claims and their legal equivalents, and not by the examples given.

The invention claimed is:
1. A method for making a composite material for use in a musical instrument, comprising:
providing a pultrusion apparatus comprising a source of a plurality of fibers, a resin bath containing a resin, a curing and forming die, a puller, and a cutter, loading said pultrusion apparatus by guiding said plurality of fibers through said resin bath to coat said fibers with said resin to provide a plurality of resin-coated fibers, guiding said plurality of resin-coated fibers through said curing and forming die to form said plurality of resin-coated fibers into a continuous bar of containing said plurality of said resin-coated fibers, guiding said continuous bar of plurality of said resin-coated fibers into said puller, said puller arranged to pull said continuous bar of said resin-coated fibers, and said fibers before being coated in said resin bath, through resin bath containing said resin, and through said curing and forming die, so that said continuous bar of resin-coated fibers leaves said puller, using said cutter to cut said continuous bar of resin-coated fibers, after it leaves said puller, into predetermined lengths to form tonebars for a musical instrument, whereby when said pultrusion apparatus is loaded and then activated, said continuous bar of resin-coated fibers will be drawn by said puller from said curing and forming die and said resin-coated fibers will be drawn from said resin bath, and said fibers will be drawn from said fiber source so that continuous bar of resin-coated fibers can be cut by said cutter into said tonebars.

2. The method of claim 1 wherein said fibers in said source of a plurality of fibers are selected from the group consisting of rovings and ribbons.

3. The method of claim 1 wherein said fibers in said source of a plurality of fibers include a combination of glass fibers and plant-based fibers.

4. The method of claim 3 wherein said plant-based fibers are selected from the group consisting of flax, ramie, and hemp.

5. The method of claim 1 wherein said source of said plurality of fibers comprises a plurality of spools or bobbins wound with a plurality of types of fibers.

6. The method of claim 5, further including a guide plate arranged to receive said plurality of fibers from said source of said plurality of fibers and secure them in a predetermined arrangement.

7. The method of claim 1 further including a source for supplying at least one flat sheet or mat of material to said resin bath along with said plurality of fibers so that said flat sheet of material is coated with said resin, and wherein said curing and forming die is arranged to receive said plurality of resin-coated fibers and said sheet or mat of material and to form said plurality of resin-coated fibers and said sheet or mat of material into a continuous bar of containing said plurality of said resin-coated fibers and said sheet of material.

8. The method of claim 7, further including a cooing station for cooling said continuous bar of containing said plurality of said resin-coated fibers before said continuous bar is guided into said puller.

9. A system for making a composite material for use in a musical instrument, comprising:
a pultrusion apparatus comprising a source of a plurality of fibers, a resin bath containing a resin, a curing and forming die, a puller, and a cutter,
said source of a plurality of fibers arranged to feed said plurality of fibers into said resin bath arranged to coat said fibers with said resin to provide a plurality of resin-coated fibers,
said resin bath arranged to feed said plurality of resin-coated fibers to said curing and forming die, said curing and forming die arranged to form said plurality of resin-coated fibers into a continuous bar of containing said plurality of said resin-coated fibers and to feed said continuous bar into said puller,
said puller arranged to pull said continuous bar of said resin-coated fibers and said fibers before being coated in said resin bath, through resin bath containing said resin, and through said curing and forming die, so that said continuous bar of resin-coated fibers leaves said puller and is fed to said cutter
said cutter arranged to cut said continuous bar of resin-coated fibers, after it leaves said puller, into predetermined lengths to form tonebars for a musical instrument,
whereby when said pultrusion apparatus is loaded and then activated, said continuous bar of resin-coated fibers will be drawn by said puller from said curing and forming die and said resin-coated fibers will be drawn from said resin bath, and said fibers will be drawn from said fiber source so that continuous bar of resin-coated fibers can be cut by said cutter into said tonebars.

10. The system of claim 9 wherein said fibers in said source of a plurality of fibers are selected from the group consisting of rovings and ribbons.

11. The system of claim 9 wherein said fibers in said source of a plurality of fibers comprise a combination of glass fibers and plant-based fibers.

12. The system of claim 9 wherein said resin is selected from the group consisting of thermoplastic, thermosetting, UV curing, and catalyzed polymers.

13. The system of claim 12 wherein said resin is selected from the group of resins which cure to have an appearance selected from the group consisting of transparent, translucent, opaque, colored, patterned, and wood-like.

14. The system of claim 9 wherein said source of said plurality of fibers comprises a plurality of spools or bobbins wound with a plurality of types of fibers.

15. The system of claim 14, further including a guide plate arranged to receive said plurality of fibers from said source of said plurality of fibers and secure them in a predetermined arrangement.

16. The system of claim 9, further including a source for supplying at least one flat sheet or mat of material to said resin bath along with said plurality of fibers so that said flat sheet or mat of material is coated with said resin, and wherein said curing and forming die is arranged to receive said plurality of resin-coated fibers and said sheet or mat of material and to form said plurality of resin-coated fibers and said sheet of material into a continuous bar of containing said plurality of said resin-coated fibers and said sheet of material.

17. The system of claim 9, further including a cooling station for cooling said continuous bar of containing said plurality of said resin-coated fibers before said continuous bar is fed into said puller.

18. A sounding element for use in a musical instrument, comprising:
a body of a resin having a predetermined shape,
said resin body having a plurality of fibers embedded in said body, said plurality of fibers comprising a combination of glass fibers and plant-based fibers in a predetermined combination of weight or volume,
whereby the relative proportions of glass fibers and plant-based fibers in said resin body can be adjusted to control the relative expression of the fundamental ring tone and its overtones or harmonics of said sounding element to obtain a desired timbre of said sounding element.

19. The combination of claim 18 wherein said sounding element is obtained by
- providing a pultrusion apparatus comprising a source of a plurality of fibers, including said glass fibers and plant-based fibers in a predetermined combination of weight or volume, a resin bath containing a resin, a curing and forming die, and a puller,
- loading said pultrusion apparatus by guiding said plurality of fibers through said resin bath to coat said fibers with said resin to provide a plurality of resin-coated fibers,
- guiding said plurality of resin-coated fibers through said curing and forming die to form said plurality of resin-coated fibers into a continuous bar of containing said plurality of said resin-coated fibers,
- guiding said continuous bar of plurality of said resin-coated fibers into said puller, said puller arranged to pull said continuous bar of said resin-coated fibers, and said fibers before being coated in said resin bath, through resin bath containing said resin, and through said curing and forming die, so that said continuous bar of resin-coated fibers leaves said puller,
- whereby when said pultrusion apparatus is loaded and then activated, said continuous bar of resin-coated fibers will be drawn by said puller from said curing and forming die and said resin-coated fibers will be drawn from said resin bath, and said fibers will be drawn from said fiber source so as to from a continuous bar of resin impregnated with said glass and plant-based fibers in said predetermined combination by weight or volume.

20. The combination of claim 19, further including providing a cutter for cutting said continuous bar of resin impregnated with said glass and plant-based fibers into predetermined lengths to provide a plurality of tone bars for a percussion instrument.

* * * * *

(12) EX PARTE REEXAMINATION CERTIFICATE (12774th)
United States Patent
Heard et al.

(10) Number: US 11,482,201 C1
(45) Certificate Issued: Nov. 26, 2024

(54) MATERIALS AND FABRICATION METHOD FOR PERCUSSIVE MUSICAL INSTRUMENTS

(71) Applicants: Robert A. Heard, Pittsburgh, PA (US); Ronald Lewis Samuels, Arcata, CA (US); Steven McHaney, Arcata, CA (US)

(72) Inventors: Robert A. Heard, Pittsburgh, PA (US); Ronald Lewis Samuels, Arcata, CA (US); Steven McHaney, Arcata, CA (US)

(73) Assignee: Marimba One, Inc.

Reexamination Request:
No. 90/019,348, Dec. 21, 2023

Reexamination Certificate for:
Patent No.: 11,482,201
Issued: Oct. 25, 2022
Appl. No.: 17/319,557
Filed: May 13, 2021

(51) Int. Cl.
*G10D 13/24* (2020.01)
*B29C 70/52* (2006.01)
*G10D 13/08* (2020.01)

(52) U.S. Cl.
CPC .......... *G10D 13/24* (2020.02); *B29C 70/526* (2013.01); *B29C 70/527* (2013.01); *G10D 13/08* (2013.01)

(58) Field of Classification Search
None
See application file for complete search history.

(56) References Cited

To view the complete listing of prior art documents cited during the proceeding for Reexamination Control Number 90/019,348, please refer to the USPTO's Patent Electronic System.

*Primary Examiner* — Jeffrey R Jastrzab (57) ABSTRACT

A method of making tonebars and other components for musical instruments comprises using a pultrusion apparatus to embed or coat glass, plant-based, and/or other fibers in or with a thermosetting, thermoplastic, or catalyzed polymer matrix. The coated fibers are pulled into a continuous bar in a curing and forming die. The bar is then cut into predetermined lengths. Each length is then carefully tuned by cutting and shaping so that when it is struck, it will emit musical notes on a chromatic musical scale. In one aspect, the fibers and resin are selected to produce tonebars for marimbas and xylophones that emulate the sound obtained from highly desirable Honduran rosewood at a fraction of the cost and environmental impact associated with this wood.

EX PARTE
REEXAMINATION CERTIFICATE

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 7, Line 4- Column 7, Line 13

The bar next moves (still under pull from puller 135) through a cooling apparatus 132 for curing and hardening the thermoplastic polymer resin. (The cooling apparatus can be omitted and the bar can be air-cooled,) Then puller 135 pulls the bar or strip and the embedded fibers or yarns itself and pushes out the bar or strip into a cutter or cutting station 140, which cuts the strip into segments, The segments or individual molded blanks are then further processed and [tunes]*tuned,* as explained below, and can then be used as tonebars in a marimba or xylophone.

Column 7, Line 40- Column 7, Line 51

As stated, the fibers leaving guide plate 115 (in a single or plural rows) are passed through resin bath 120 where they pick up *and* are coated with a resin 125. Resin 125 is a thermoplastic, thermosetting, catalyzed, or UV-cured polymer. In the present example the resin is thermoplastic polycarbonate. As indicated, bath 125 contains or is coupled to a heater to keep resin 125 liquid but viscous enough to adhere to the spaced fiber strands being pulled therethrough.

Column 12, Line 65- Column 13, Line 4

Natural wood is orthotropic, meaning that its properties vary in orthogonal directions. This is a result of the orientation of the natural fibers of the wood. Wooden tonebars are created with fibers [of] oriented primarily in the longitudinal direction of the bar, as can be seen in the grain patterns of the bars. The orientation of fibers contributes to important desirable musical and strength characteristics in tonebars.

Column 15, Line 36- Column 15, Line 59

FIGS. 4*a* and 4*b* show a tonebar (perspective and elevational end views) where the top layer is all-glass fibers 400[.] *and* the ribbons or layers below the glass layer down to the top of the labeled tuning undercut have alternating rows of glass rovings 400 and low twist natural fiber yarns 405. I.e., in each layer below [to] *the* top layer and above the undercut, the rows alternate between glass rovings 400 and low twist natural fiber yarns 405, as illustrated, The layers of rows within the range of the undercut, which lies at the lower portion of bar 160B, are made of glass fibers 400 only and these are pultruded and encased along with the alternating and all-glass rows above the undercut, The natural fibers are used above the undercut because the modes of vibration are predominately affected by the material above the undercut, which is where it is desirable for the natural fibers to have their dampening effect. The natural fibers may also be arranged in other patterns to achieve the desired acoustical effect. The twist of rovings 400 and yarn 405 is two turns per cm, although other amounts of twist can be used. A plurality of transverse threads 410 are periodically secured to all of the rows in each layer before the fibers in these layers enter resin bath 120 (FIG. 1) to hold the fibers in place during pultrusion. Threads 410 are secured to the fibers using adhesives or thermal bonding.

Column 16, Line 36- Column 16, Line 57

While the above description contains many specificities, these should not be construed as limitations on the scope, but as exemplifications of some present embodiments. Many other ramifications and variations are possible within the teachings. For example, glass may be blended with natural fibers into uniform hybrid yarns or may be used separately. Fibers woven into yarns may be used as individual strands or may be woven into ribbons prior to use. The tonebars can be made thicker or thinner; they can have different shapes; and they may be made in colors or made to look like Honduran rosewood, if desired. The mat (ribbons) can be made up of a combination of glass (or other fibers mentioned elsewhere) and natural fiber. This saves time in the setup of the pultrusion process because it combines both the glass etc. fibers and natural fibers in a single ribbon. The hybrid layers of alternating glass and fiber rows of FIG. 4 [and] *can* instead be substituted with alternating layers of all-glass and all-fiber rows. The roving, ribbon, or mat can be made exclusively of mineral, glass, metal, and polymer materials, or exclusively of plant-based fibers, or of a combination of mineral, glass, metal, and polymer materials and plant-based fibers spun together in rovings, ribbons, or mats.

AS A RESULT OF REEXAMINATION, IT HAS BEEN DETERMINED THAT:

Claims 1-20 are cancelled.

\* \* \* \* \*